(12) United States Patent
Weber et al.

(10) Patent No.: US 7,743,910 B2
(45) Date of Patent: Jun. 29, 2010

(54) SYSTEMS FOR PROCESSING WORKPIECES AND MECHANICAL ARRANGEMENTS FOR MOVING WORKPIECES AND/OR WORKPIECE REMNANTS

(75) Inventors: Joerg Weber, Obersulm (DE); Winfried Kurrer, Augsburg (DE)

(73) Assignee: Trumpf Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 12/258,612

(22) Filed: Oct. 27, 2008

(65) Prior Publication Data
US 2009/0116939 A1 May 7, 2009

Related U.S. Application Data

(63) Continuation of application No. PCT/EP2006/004046, filed on Apr. 29, 2006.

(51) Int. Cl.
B65G 35/00 (2006.01)
(52) U.S. Cl. .................. 198/619; 198/346.1
(58) Field of Classification Search ........... 198/343.1, 198/346.1, 465.3, 468.01, 619, 624, 625, 198/750.1; 414/222.03
See application file for complete search history.

(56) References Cited

U.S. PATENT DOCUMENTS

| | | | | |
|---|---|---|---|---|
| 3,475,579 A | * | 10/1969 | Moyer | 219/80 |
| 3,907,125 A | * | 9/1975 | Seckinger | 198/345.3 |
| 4,425,960 A | * | 1/1984 | Reuter et al. | 164/426 |
| 4,867,297 A | * | 9/1989 | Saitoh et al. | 198/346.2 |
| 4,890,725 A | * | 1/1990 | Fierkens et al. | 198/774.1 |
| 5,282,529 A | * | 2/1994 | Schwammle | 198/465.3 |
| 5,406,863 A | * | 4/1995 | Korge | 74/439 |
| 5,407,058 A | * | 4/1995 | Gyger | 198/465.3 |
| 5,526,754 A | * | 6/1996 | Kunczynski | 104/196 |
| 5,922,230 A | * | 7/1999 | Yokota | 219/388 |
| 6,367,677 B1 | | 4/2002 | Hildenbrand et al. | |

(Continued)

FOREIGN PATENT DOCUMENTS

EP 0781626 7/1997

(Continued)

OTHER PUBLICATIONS

International Preliminary Report on Patentability from corresponding PCT Application No. PCT/EP2006/004046, mailed Nov. 4, 2008, 8 pages, English translation of same, mailed Dec. 10, 2008, 5 pages.

(Continued)

*Primary Examiner*—Douglas A Hess
(74) *Attorney, Agent, or Firm*—Fish & Richardson P.C.

(57) ABSTRACT

A mechanical arrangement for moving workpieces and/or processing remnants from processing of a workpiece comprises a load carrier and a load carrier drive. Part of the load carrier drive is formed by a rigid chain which is acted upon by a chain driving wheel supported on the load carrier. Owing to that action, the chain driving wheel takes the load carrier with it to a target position. In the process, the chain driving wheel moves together with the load carrier relative to a chain abutment against which the rigid chain is braced. Systems for processing workpieces are provided, which make use of a mechanical arrangement of the above-mentioned kind.

24 Claims, 6 Drawing Sheets

U.S. PATENT DOCUMENTS

| | | | | |
|---|---|---|---|---|
| 6,695,120 B1 * | 2/2004 | Trammell | ................... | 198/375 |
| 7,090,068 B2 * | 8/2006 | Matsuo | .................... | 198/465.1 |
| 7,137,769 B2 * | 11/2006 | Komatsu et al. | ....... | 414/222.01 |
| 7,258,223 B2 * | 8/2007 | Strange | ................... | 198/465.2 |
| 7,500,435 B2 * | 3/2009 | Bartlett et al. | .............. | 104/165 |
| 7,559,738 B2 * | 7/2009 | Salm et al. | ................. | 414/799 |

FOREIGN PATENT DOCUMENTS

EP        1046459        10/2000

OTHER PUBLICATIONS

International Search Report from corresponding PCT Application No. PCT/EP2006/004046, mailed Dec. 28, 2006, 8 pages.

* cited by examiner

SYSTEMS FOR PROCESSING WORKPIECES AND MECHANICAL ARRANGEMENTS FOR MOVING WORKPIECES AND/OR WORKPIECE REMNANTS

CROSS REFERENCE TO RELATED APPLICATIONS

This application is a continuation of and claims priority under 35 U.S.C. §120 to PCT Application No. PCT/EP2006/004046, filed on Apr. 29, 2006. The contents of that priority application are hereby incorporated by reference in its entirety.

TECHNICAL FIELD

The invention relates to mechanical arrangements for moving workpieces and/or remnants from processing of a workpiece, and to systems for processing workpieces that include a processing unit and a mechanical arrangement of the above-mentioned kind.

BACKGROUND

The company TRUMPF, 71254 Ditzingen, Germany, offers a mechanical system under the name TLC® 1005 for the cutting, welding and surface treatment of metallic workpieces by laser. That system is available with an automatic pallet changing system. Pallets of the pallet changing system with workpieces placed thereon are fed to the working area of the system prior to workpiece processing. When processing is complete, the pallets with the then processed workpieces are moved out of the working area of the system. Each pallet has its own drive unit. The drive means used are floor-mounted endlessly circulating toothed belts. When several pallets are used to service the working area of the system, the individual pallets may be movable in the same axial direction or in axial directions running perpendicular to one another.

EP 0 781 626 A1 discloses a table changing device for a machine for processing workpieces. At a processing unit for processing metallic workpieces two workpiece tables are moved alternately into a loading and unloading position, on the one hand, and into a processing position, on the other hand. For that purpose the workpiece tables are attached to two endless drive chains, each circulating with a top strand and a bottom stand. Stationary chain driving wheels, which are seated on the drive shaft of a likewise stationary drive motor, are used to drive the endless drive chains.

The workpiece table drive system disclosed in EP 0 781 626 A1 and described above occupies a relatively large amount of space and forms an interference contour which is constantly present and which may hinder functional use of the prior-known arrangement.

SUMMARY

In one aspect, the invention features a mechanical arrangement for moving workpieces and/or remnants from processing of a workpiece, in which a rigid chain is provided as the drive chain. The mechanical arrangement includes a load carrier which can be loaded with a workpiece and/or with a processing remnant, and a load carrier drive by means of which the load carrier is movable into a target position. The load carrier drive includes a drive motor, a rigid drive chain, and a chain driving wheel, supported on the load carrier and drivingly connected with the drive motor, which, when driven by the drive motor, acts on the rigid drive chain. The rigid drive chain is configured to convert a driving movement of the chain driving wheel into a movement of the load carrier into the target position, and is braced against a chain abutment, relative to which the chain driving wheel moves together with the load carrier.

Rigid chains are especially advantageous in the mechanical arrangements described herein, in that they can be used in a single layer. There is therefore no need for a top strand and a bottom strand. A rigid chain consequently occupies far less space than an endlessly circulating drive chain of conventional design. The interference contour formed by a rigid chain is correspondingly small.

The chain driving wheel of the load carrier drive being supported on the load carrier, and hence moving together with the load carrier as the latter is moved into the target position, also has the effect of minimizing the interference contour presented by the load carrier drive. Accordingly, the interference contour caused by the chain driving wheel of the load carrier drive also moves together with the load carrier. Consequently, the area that is free of the load carrier is kept free of that interference contour.

In some cases, the mechanical arrangement further comprises a chain magazine configured to take up a chain reserve length of the rigid drive chain on the side of the site of action of the chain driving wheel remote from the chain abutment.

In some implementations, features are provided which serve to minimize the interference contour in the area that is free of the load carrier. For example, the chain magazine can be carried along together with the load carrier. In addition, or alternatively, the drive motor of the load carrier drive can be moved together with the load carrier.

For simplicity, the common movement of the load carrier, on the one hand, and of the chain magazine and/or the drive motor of the load carrier drive, on the other hand, is accomplished by means of the chain magazine and/or the drive motor being provided on the load carrier.

In the movement of the load carrier and in the movement of the chain driving wheel of the load carrier drive which is performed in common therewith, the pushed length of the rigid chain, i.e. the portion of the rigid chain between the chain abutment of the load carrier drive and the site of action of the chain driving wheel, becomes shorter or longer. As the pushed length becomes shorter, the relevant part of the rigid chain is to be taken up from a chain rest and, as the pushed length becomes longer, is to be laid down on the chain rest. It is preferred that defined conditions exist both when the rigid chain is being taken up and when it is being laid down. So that the rigid chain will enter and exit a drive housing of the chain driving wheel in a defined manner, a preferred embodiment of the invention provides that the drive housing opens towards the chain rest via an entry and exit guide for the rigid chain, which guide is preferably inclined with respect to the chain rest. Defined conditions at the chain entry and exit can minimize wear on the rigid chain and on the components cooperating therewith, and minimize noise emissions.

In some implementations, a level support surface provided on a separate rest element is available to the pushed length of the rigid chain. Preferably, the rest element is let in flush. It may furthermore be made of a noise-minimizing and/or wear-minimizing material or be provided with a corresponding lining. By means of a rest protrusion, kinking of the rigid chain to the side can be effectively prevented.

A sufficiently broad base is accordingly available both for the driving of the rigid chain and for the guiding thereof in the chain magazine for the chain reserve length and/or in the drive housing of the chain driving wheel. This prevents, in particular, twisting of the rigid chain.

In some implementations, a processing position at the processing unit is provided as a target position of the load carrier and in which the chain abutment of the load carrier drive is situated close to the processing position of the load carrier. Owing to the chosen arrangement of the chain abutment, the pushed length of the rigid chain between the chain abutment and the chain driving wheel when the load carrier is in the processing position is extremely small. The pushed length of the rigid chain is accordingly formed by merely a small number of rigid-chain links. As a result, any backlash between individual rigid-chain links may add up to only a small overall backlash at the most. This results in turn in a high positional accuracy of the load carrier in the processing position. Associated with this is a high positional accuracy of the load on the load carrier, especially of workpieces laid on the load carrier. It is precisely in the processing position of the load carrier that such a great positional accuracy is of particular importance. It forms an essential prerequisite for an optimum outcome of the workpiece processing operation performed with the processing unit.

The details of one or more embodiments of the invention are set forth in the accompanying drawings and the description below. Other features and advantages of the invention will be apparent from the description and drawings, and from the claims.

DESCRIPTION OF DRAWINGS

FIGS. 3 and 3A show one of the changing tables according to FIGS. 1 and 2 in two different positions and at the same time in a partly sectional view in the direction of the arrow III in FIG. 2.

Like reference symbols in the various drawings indicate like elements.

DETAILED DESCRIPTION

Figure 1:
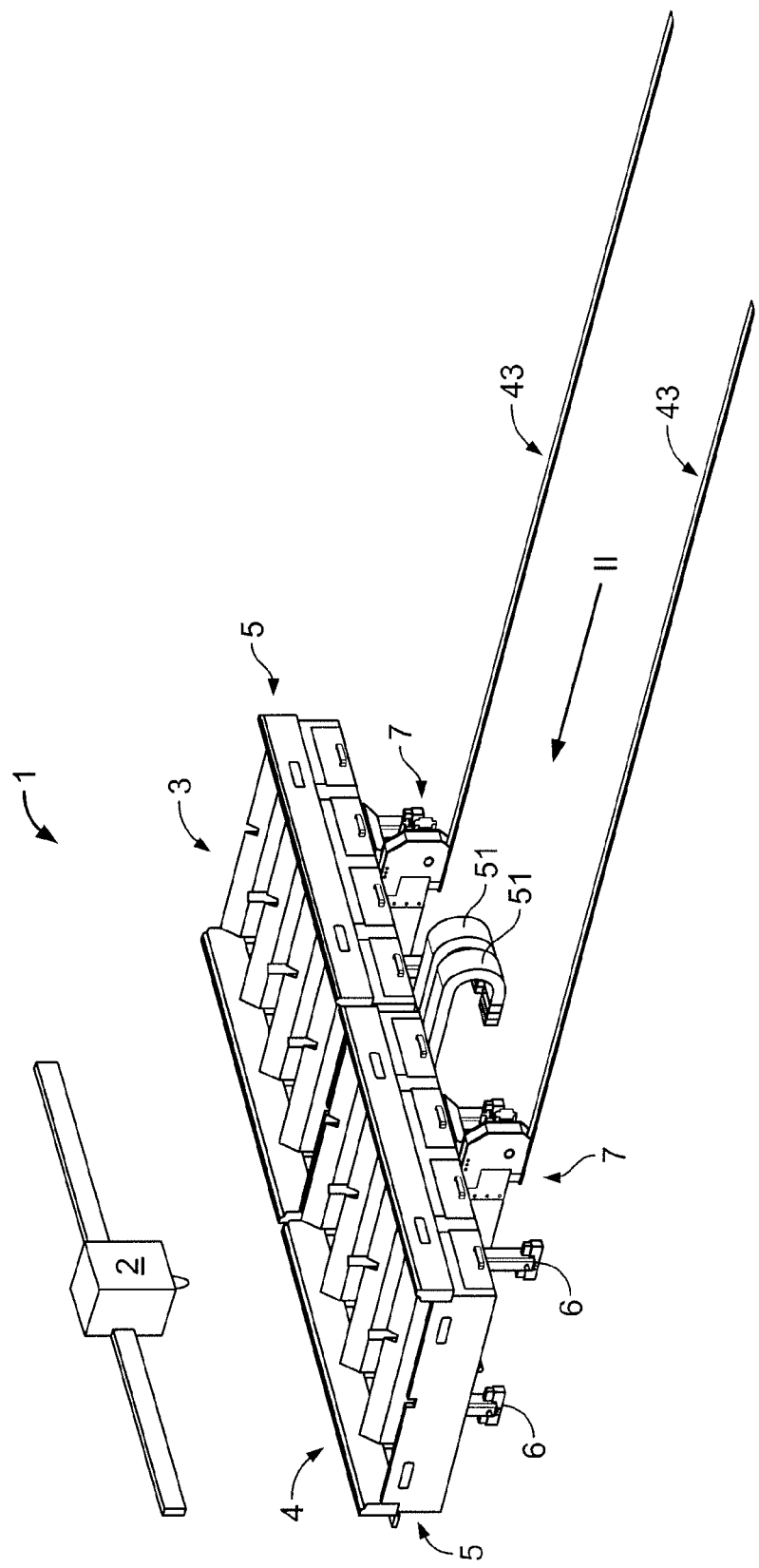
FIG. 1 is a perspective illustration of two changing tables for feeding a laser processing unit with metal sheets to be processed.

As shown in FIG. 1, a mechanical arrangement 1 for processing workpieces, for example for the cutting, welding and surface treatment of metal sheets and sheet metal parts, e.g., car body parts. Mechanical arrangement 1 comprises a processing unit 2, shown highly schematically, and changing tables 3, 4. The processing unit 2 is a conventional laser unit. The changing tables 3, 4 form mechanical arrangements for moving the workpieces that are to be processed and, if applicable, for moving remnants from processing.

Each of the changing tables 3, 4 has a load carrier 5. Each load carrier 5 is provided with support bars, which for the sake of simplicity are not shown in FIG. 1, for the workpieces to be processed. The support bars may also be used to support processing remnants left after workpiece processing, for example residual lattices. The support bars are of a conventional design and accordingly support the workpieces and the processing remnants on vertices of the bars (cf. FIG. 3).

The load carriers 5 are movable on the bed of the overall arrangement, which is of a modular construction, by means of four carriages 6 in each case. A load carrier drive 7 is provided as the movement drive for each load carrier 5.

Figure 2:
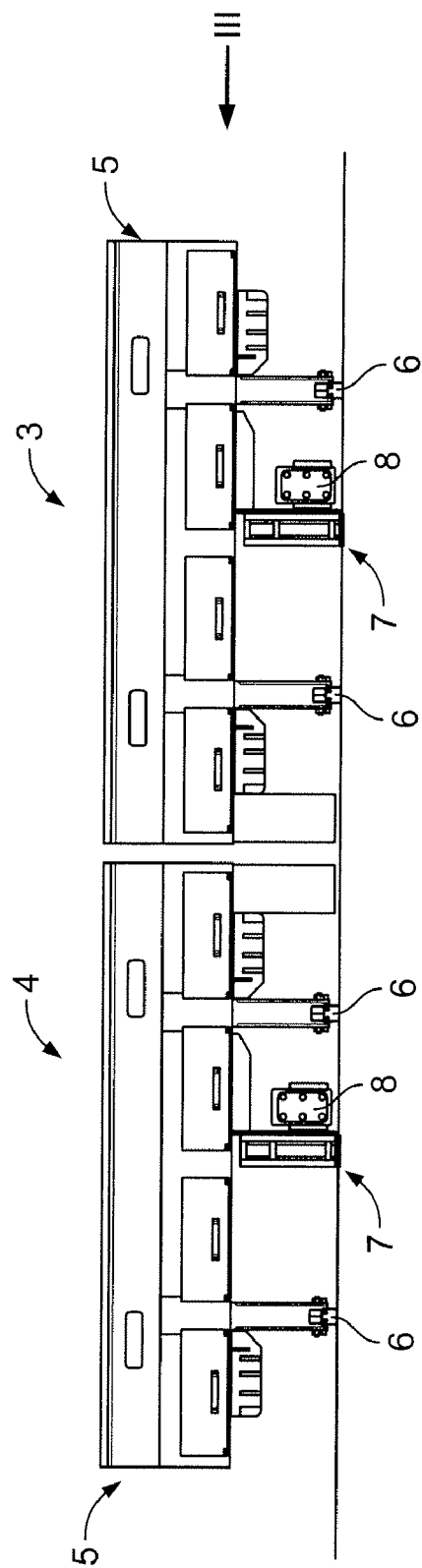
FIG. 2 shows the changing tables according to FIG. 1 in plan view in the direction of the arrow II in FIG. 1.
Figure 7:
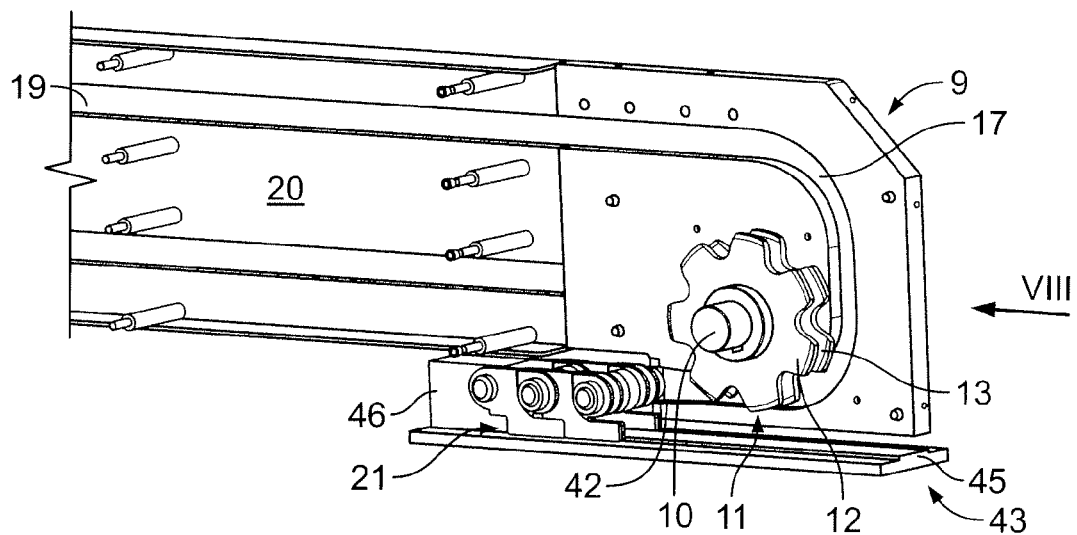
FIG. 7 is a partial illustration of a chain magazine, a drive housing with chain driving wheel and a rigid chain of the changing tables according to FIGS. 1 to 3.
Figure 8:
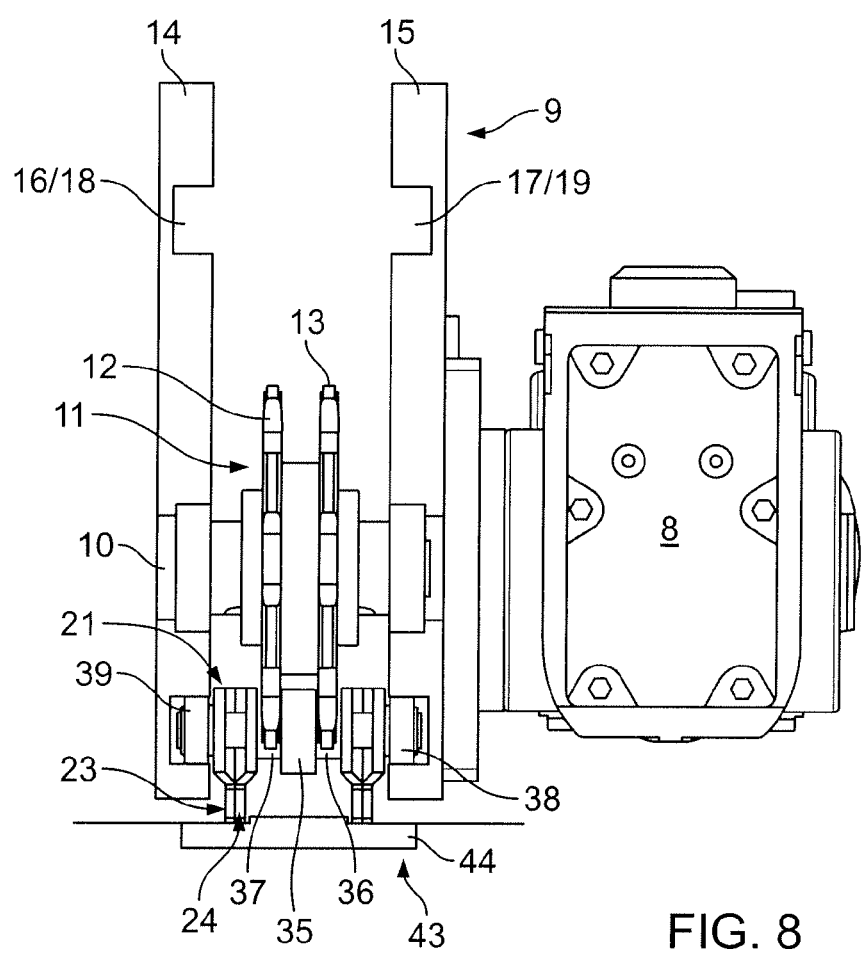
FIG. 8 shows the arrangement according to FIG. 7 in plan view in the direction of the arrow VIII in FIG. 7 with the drive housing and chain magazine closed on both sides.

Referring to FIG. 2, each of the load carrier drives 7 comprises an electric drive motor 8, which is flange-mounted to the side of a drive housing 9, which is in turn connected to the load carrier 5. As shown in FIGS. 7 and 8, a drive shaft 10, connected to the drive motor 8 via gearing, passes through the drive housing 9. In the interior of the drive housing 9, there is seated on the drive shaft 10 a chain driving wheel 11 comprising two star-shaped sprocket wheels 12, 13 spaced apart in the axial direction of the drive shaft 10 (FIGS. 7, 8). Chain guides 16 and 17 are provided on opposite side walls 14, of the drive housing 9. The running surfaces of the chain guides 16, 17 are made of hardened steel. Chain guides 18, 19 of a chain magazine 20 continue as an extension of the chain guides 16, 17 on the drive housing 9. The chain guides 18, 19 of the chain magazine 20 consist of a Teflon-like plastics material.

Figure 3:
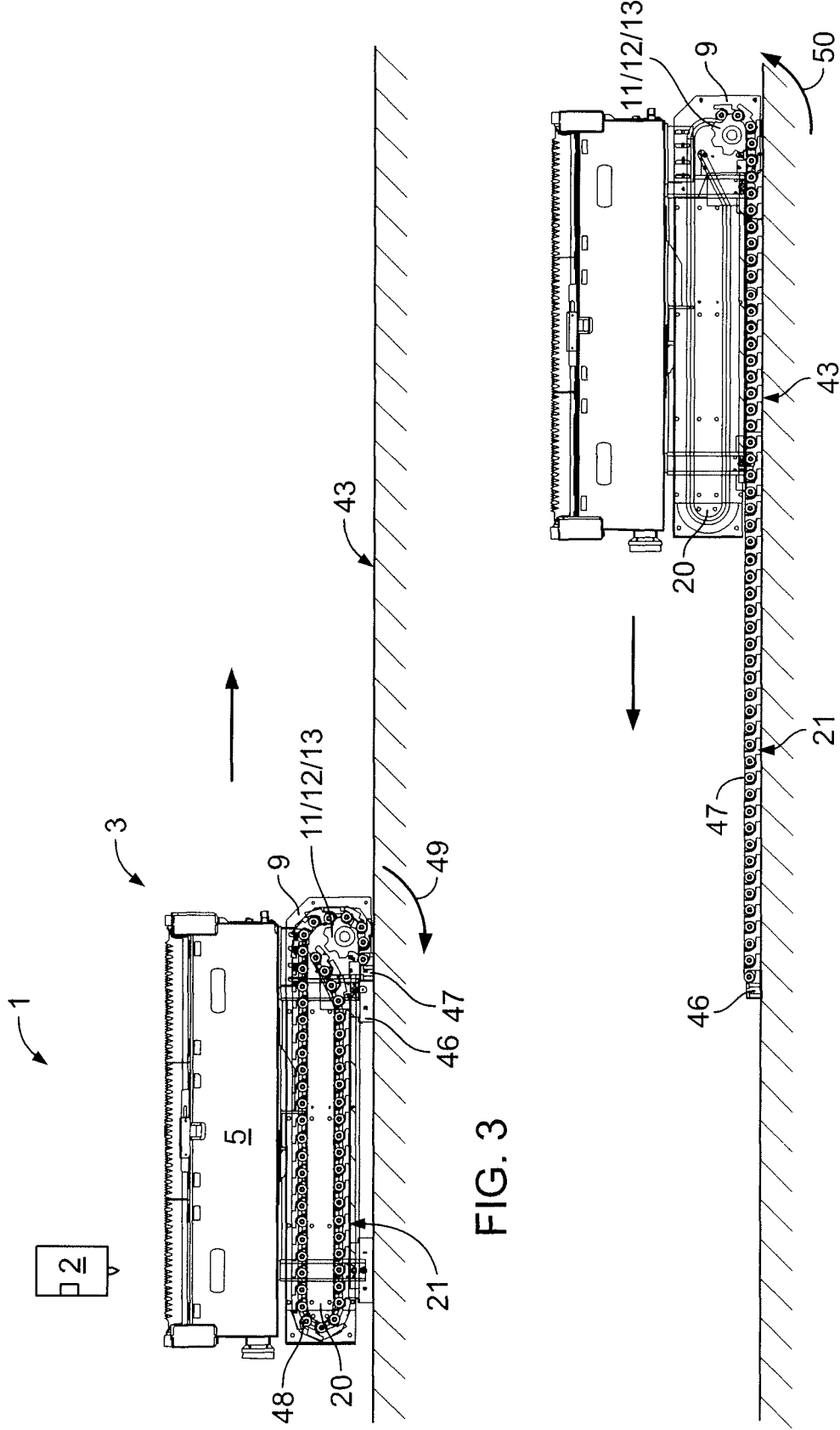

By means of the chain guides 16, 17 of the drive housing 9 and by means of the chain guides 18, 19 of the chain magazine 20, a rigid chain 21 is guided through the drive housing and chain magazine. As shown in FIGS. 3 and 3A, and described in further detail below, the load carrier 5 is moved back and forth between two positions by the rigid chain 21 being pushed out of and taken up into the chain magazine 20 in response to the drive motor 8 driving the chain driving wheel 11.

Rigid chains are known per se. In contrast to conventional drive chains, rigid chains are capable of transmitting not only pulling forces but also pushing forces. A special constructional shape of the mutually adjacent chain links prevents them from kinking when subjected to thrust. Generally, rigid chains are made rigid by projections that project from each chain link towards the adjacent chain link and which are supported, under active thrust, on a shoulder of the adjacent chain link and thereby counteract deflection to one side. In the opposite direction, the mutually adjacent chain links of rigid chains are able to swivel relative to one another.

Figure 4:
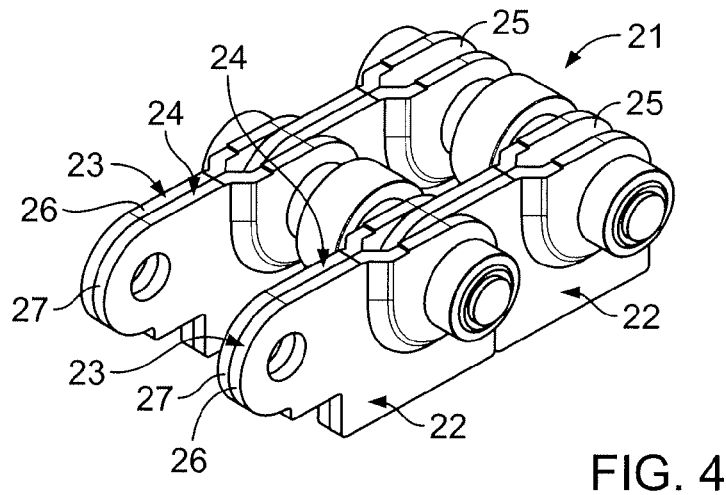
FIGS. 4, 5 and 6 are illustrations of rigid chains of the changing tables according to FIGS. 1 to 3.

The rigid chain consists of a series of chain links. Two directly adjacent chain links 22 of a preferred type of rigid chain 21 are shown in detail in FIGS. 4 to 6.

Figure 5:
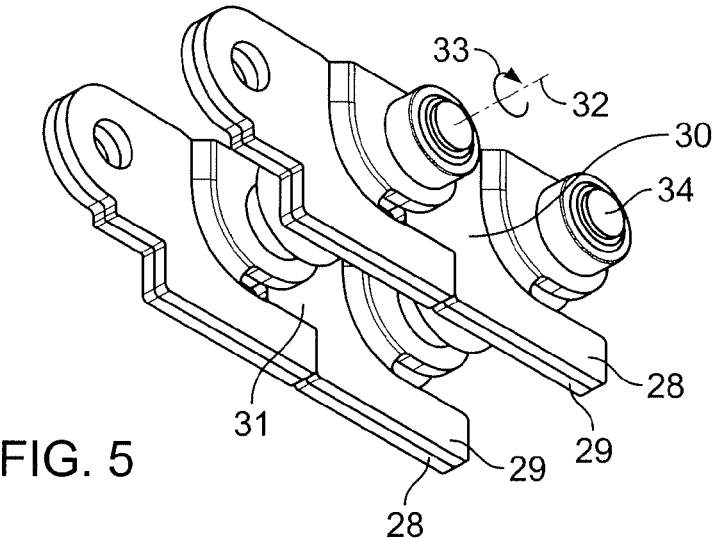

As shown, each of the chain links 22 comprises two pairs of chain link plates 23, 24 extending in the longitudinal direction of the chain. At one of their longitudinal ends, the chain link plates 23, 24 of each pair are offset in opposite directions, such that the two chain link plates are spaced from each other at one end. This spacing creates a pocket 25 at one end of each pair of chain link plates. This pocket 25 receives the longitudinal ends 26, 27 of the opposite end of an adjacent pair of chain link plates, which ends are in contact with each other and thus fit readily into the pocket. At their longitudinal ends that are provided with the offsets in opposite directions, the chain link plates 23, 24 also have arm-like projections 28, 29. By means of the arm-like projections 28, 29, the chain link plates 23, 24 of one chain link 22 are supported on shoulders 30, 31 of the chain link plates 23, 24 of the adjacent chain link 22. Owing to that support, mutually adjacent chain links 22 can be swiveled only in one direction relative to each other about a swivel axis 32. That swiveling direction is illustrated in FIG. 5 by an arrow 33.

The swivel axis 32 is formed by link pins 34 extending in the transverse direction of the rigid chain 21. The link pins 34 pass through the pairs of chain link plates 23, 24, which pairs lie opposite and spaced from each other, in the region of the pockets 25 and in so doing form a connection between mutually adjacent chain links 22.

The pairs of link plates belonging to the individual chain links 22 and disposed one behind another in the longitudinal direction of the rigid chain 21 form in each case a two-layered row of link plates extending in the longitudinal direction of the chain. The two two-layered link plate rows of the rigid chain 21 are composed of identical link plate pairs. As discussed above, each link plate pair comprises a chain link plate 23 with an offset to one side and a chain link plate 24 with an offset to the other side. If the chain link plates 23, 24 have different production tolerances depending on the direction of the offset, the individual tolerances in the two two-layer link plate rows add up to the same overall tolerance. In that manner, skewing of the link pins 34, which are received in bearing eyelets of the chain link plates 23, 24, and associated disadvantages to the guiding of the rigid chain 21 are avoided.

Figure 6:
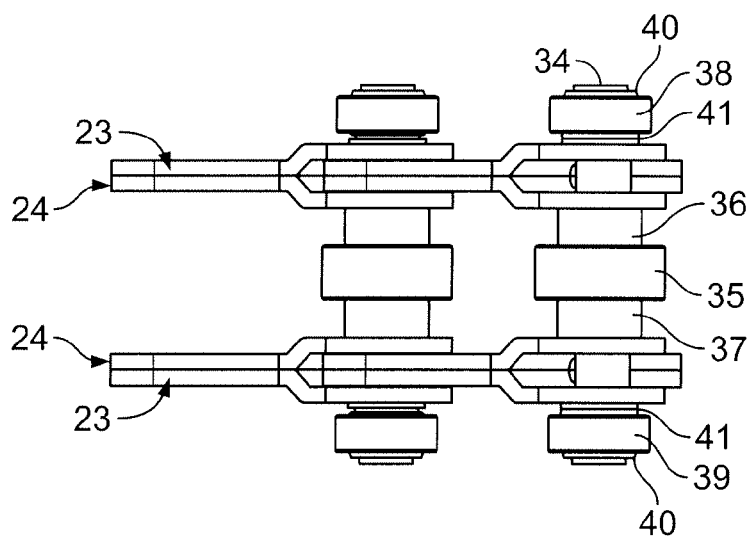

Referring to FIG. 6, seated on the link pins 34 between the mutually spaced pairs of link plates there is a central guide roller 35. Pressure rollers 36, 37 are arranged adjacent to and on both sides of the central guide roller 35. On the outer side of the outer chain link plates 23 of the link plate pairs, each link pin 34 supports outer guide rollers 38, 39 at its longitudinal ends. Circlips 40, 41 on both sides of the outer guide rollers 38, 39 provide for the outer guide rollers 38, 39 to be supported in such a way that they experience little wear, and which prevents the guide rollers 38, 39 from jamming.

Both the central guide roller 35 and the pressure rollers 36, 37 are seated directly on the link pins 34. The outer guide rollers 38, 39 are supported on the respective link pins 34 by plain bearings. All rotational connections in the rigid chain 21 are at the most dry-lubricated. Lubricants that might bind contaminants, especially dust, present in the area surrounding the rigid chain 21 are dispensed with.

The guiding of the rigid chain 21 in the region of the chain driving wheel 11 can be understood especially by reference to FIGS. 7 and 8.

The driving force is introduced into the link pins 34 of the rigid chain 21 by means of the star-shaped sprocket wheels 12, 13 of the chain driving wheel 11 via the pressure rollers 36, 37. Since the driving force is introduced at two locations spaced apart in the axial direction of the link pins 34, a broad base is available for the introduction of force.

The rigid chain 21 is guided through the chain guides 16, 17 of the drive housing 9 and the chain guides 18, 19 of the chain magazine 20 by means of the outer guide rollers 38, 39 of the chain links 22. That guiding arrangement also has a broad base.

The rigid chain 21 is finally also guided by means of the central guide roller 35 of the chain links 22, which lies on the chain driving wheel 11 between the star-shaped sprocket wheels 12, 13.

All in all, twist-free and kink-free running of the rigid chain 21 in the interior of the drive housing 9 and in the interior of the chain magazine 20 is ensured. This is accompanied by a minimization of noise emissions and wear during operation of the load carrier drive 7.

The drive housing 9 opens towards the area surrounding the changing tables 3, 4 via an entry and exit guide 42. The entry and exit guide 42 has a portion 42*a* that is inclined towards a chain rest 43. The chain rest 43 is disposed substantially flush with the surface supporting the mechanical arrangement 1 and the respective changing tables 3, 4. Referring to FIG. 7, the chain rest 43 is formed by a rest element in the form of a steel plate 44 extending in the direction of movement of the associated changing table 3, 4. Its central portion is raised to form a rest protrusion 45. Preferably, the rest protrusion 45 projects three to four millimeters above the surface supporting the mechanical arrangement 1 and the changing tables 3, 4, and the remainder of the steel plate 44 is disposed flush with the supporting surface. By means of the rest protrusion 45, the chain rest 43 engages between the pairs of link plates of the rigid chain 21 laid down on the chain rest 43, which pairs of link plates are spaced apart in the transverse direction of the chain. Cooperating with said pairs of link plates, the rest protrusion 45 of the chain rest 43 has the effect of laterally guiding the rigid chain 21 and thus prevents it from kinking sideways. To minimize noise emissions when the rigid chain 21 is being laid down and taken up, the chain rest 43 may be provided with a noise-reducing lining, for example with a plastics coating.

At the longitudinal end of the chain rest 43 visible in FIGS. 3 and 7, the bed of the changing table 3, 4 is provided with a chain abutment 46 which is preferably defined by or mounted at one end of the chain rest 43. The rigid chain 21 is fastened at one end to, and braced against, the chain abutment 46.

The operation of the changing tables 3, 4 is illustrated in FIGS. 3 and 3A.

The changing table 3 is shown together with two target positions of the load carrier 5, namely the processing position of the load carrier 5 (FIG. 3) and the loading and unloading position of the load carrier 5 (FIG. 3A).

The chain abutment 46 is arranged in such a manner that, when the load carrier 5 is in the processing position (FIG. 3), the length of the rigid chain 21 between the chain abutment 46, over which the load carrier 5 travels, and the chain driving wheel 11, i.e. a pushed length 47 of the rigid chain 21, is reduced to a minimum. At the same time, the length of the rigid chain 21 on the other side of the chain driving wheel 11, that is, a chain reserve length 48 of the rigid chain 21, is at a maximum. The minimization of the pushed length 47 of the rigid chain 21 is accompanied by a minimization of the number of chain links 22 making up the pushed length 47 of the rigid chain 21. This results in turn in a minimization of the backlash between the individual chain links 22 of the pushed length 47 which makes up the overall backlash when added together. As a result, it is possible to position the load carrier 5 and therewith also the workpiece placed thereon, which for simplicity is not shown, with the optimum accuracy. Optimum accuracy in positioning the workpiece to be processed is a prerequisite for an optimum outcome of the workpiece processing operation performed with the processing unit 2.

As shown in FIG. 3, when the load carrier 5 is in the processing position, the rigid chain 21 is almost completely taken up in the chain magazine 20. The area in front of the mechanical arrangement 1 is therefore free of any interference contour. Protruding above the surface supporting the changing table 3 there is at most the rest protrusion 45 of the chain rest 43. Since that projecting height is only a few millimeters, however, the usability of the area in front of the mechanical arrangement 1 and hence, in particular, the accessibility of the load carrier 5 is affected to a negligible extent at the most.

When processing of the workpiece is complete, the load carrier 5 is moved out of the processing position into the loading and unloading position (FIG. 3A). For this, the drive motor 8 drives the chain driving wheel 11 in a rotational direction 49. The chain driving wheel 11 acts in turn on the rigid chain 21 braced against the chain abutment 46 and consequently moves in the direction towards the unloading position together with the load carrier 5.

In the course of the translational movement of the load carrier 5, the rigid chain 21 leaves the chain magazine 20 via the drive housing 9 and is laid down, outside the drive housing 9, on the chain rest 43. As the rigid chain 21 moves through the chain magazine 20 and the drive housing 9, it is guided in the manner described above. Owing to the guiding of the rigid chain 21 in the drive housing 9, the driving force introduced into the rigid chain 21 via the chain driving wheel 11 causes the pushed length 47 of the rigid chain 21 to be subjected to thrust parallel to the bed of the respective changing table 3, 4.

The rigid chain 21 reaches the chain rest 43 via the entry and exit guide 42 of the drive housing 9. As the rigid chain 21 is laid down on the chain rest 43, the rest protrusion 45 of the latter comes to lie between the link plate rows of the rigid chain 21 which are spaced apart in the transverse direction of the chain.

Altogether, defined conditions are obtained at the rigid chain 21 during movement of the load carrier 5 into the loading and unloading position, when the chain is both inside and outside the chain magazine 20 and the drive housing 9.

Once the load carrier 5 reaches the loading and unloading position, the workpiece placed on the load carrier 5 or a processing remnant left thereon, for example a residual lattice from the preceding workpiece processing operation, is unloaded manually or automatically. Another workpiece to be processed is then placed on the load carrier 5.

When the load carrier 5 is in the loading and unloading position, the interference contour behind the load carrier 5 is essentially limited to the pushed length 47 of the rigid chain 21 laid down in that area. The interference contour thus produced is small by virtue of the small volume of the rigid chain 21 and consequently does not result in use of the area behind the load carrier 5 being significantly affected. As is customary, supply lines for the load carrier 5, which travel with the load carrier 5 during movement thereof, are also in the area behind the load carrier 5. In FIG. 1, drag chains 51 are indicated, in the interior of which these supply lines (not shown) are accommodated in the conventional manner.

The new workpiece placed on the load carrier 5 which has been moved to the loading and unloading position has to be moved to its processing position. For this, the drive motor 8 drives the chain driving wheel 11 in a rotational direction 50 (FIG. 3A). The chain driving wheel 11 engaging in the rigid chain 21 consequently draws the load carrier 5 in the direction towards the processing position. In the process, the rigid chain 21 is taken up from the chain rest 43 and pushed through the drive housing 9 into the chain magazine 20. As the load carrier 5 moves into the processing position, the pushed length 47 of the rigid chain 21 becomes shorter. The rigid chain 21 runs in the process via the inclined entry and exit guide 42 of the drive housing 9. As a result of being guided in a defined manner, the rigid chain 21 moves smoothly into the drive housing 9 and finally into the chain magazine 20.

The length of travel of the load carrier 5 can be varied in a simple manner by controlling the load carrier drive 7. It is merely necessary for the maximum pushed length 47 and the maximum chain reserve length 48 of the rigid chain 21 to be defined appropriately to the particular requirements. Irrespective of the length of travel that has been set, the area in front of the load carrier 5 is free of any interference contour, and the area behind the load carrier 5 is almost free of an interference contour.

Owing to the precise guiding of the rigid chain 21, both the displacement movement of the load carrier 5 from the processing position to the loading and unloading position and the displacement movement of the load carrier 5 in the opposite direction may be carried out at relatively high speed. Speeds of more than 40 m/min can be obtained. Consequently, a large number of work cycles can be achieved. More than 500 work cycles per day are possible. Owing to the minimization of wear achieved, the components of the system have a long service life.

Figure 9:
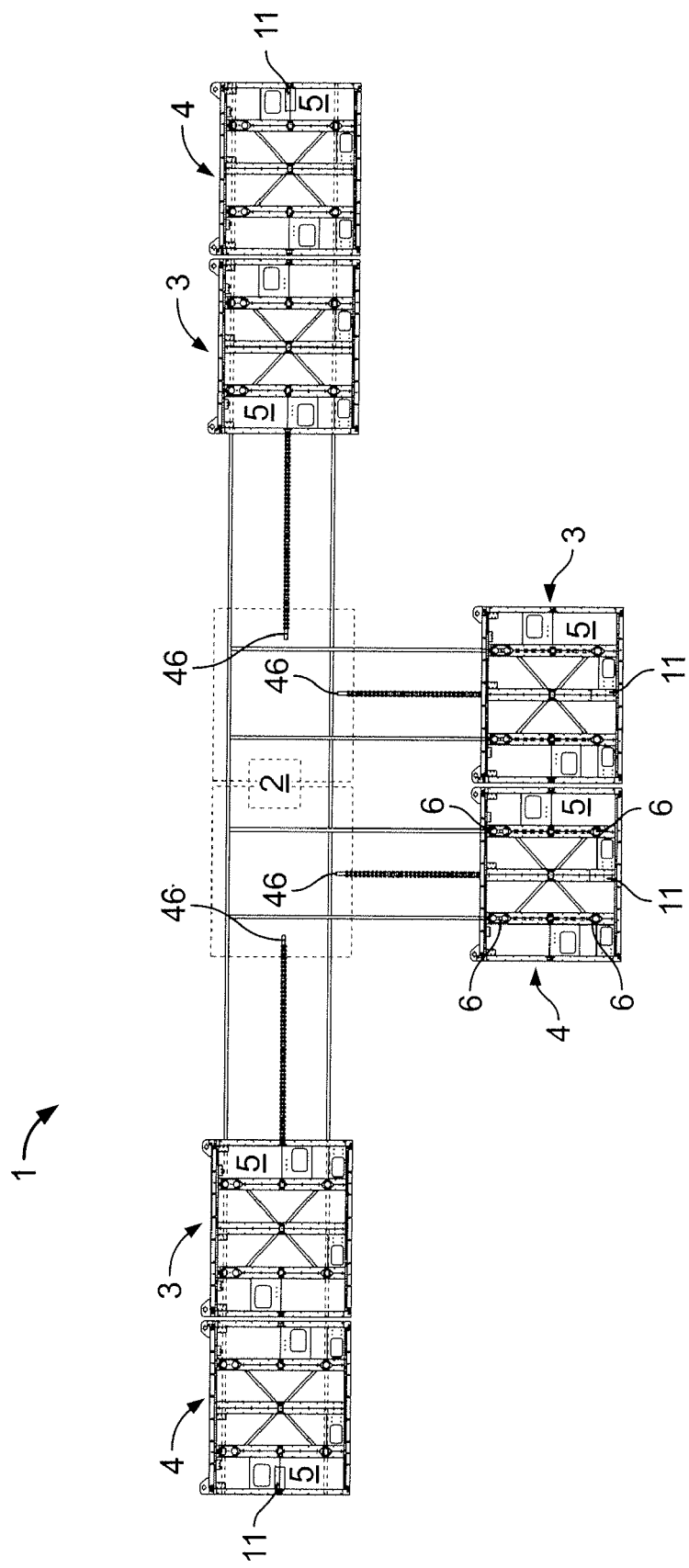
FIG. 9 shows a system comprising three pairs of changing tables in plan view.

As shown in FIG. 9, the processing unit 2 of the mechanical arrangement 1 is served by a total of 3 pairs of changing tables 3, 4. The changing tables 3, 4 of each changing table pair that are on the outside in the drawing are coupled to one another to form a unit. The changing tables 3, 4 of the middle changing table pair may be moved in coupled relationship or individually. The movement axes of the changing tables 3, 4 of the middle changing table pair, on the one hand, and the movement axes of the changing tables 3, 4 of the outer changing table pairs, on the other hand, are perpendicular to each other. A processing position for the load carriers 5 is common to all the changing tables 3, 4. That processing position at the centre of the illustration is indicated by two rectangles arranged side by side.

For operation of the changing tables 3, 4 of the three changing table pairs with movement axes crossing each other, the arrangement of the individual chain abutments 46, on the one hand, and the arrangement of the chain driving wheels 11, concealed in the drawing, on the load carriers 5 of the changing tables 3, 4, on the other hand, is particularly important.

The chain driving wheels 11 are provided on that edge of the load carriers 5 which is remote from the respective chain abutment 46. At the same time, the chain abutments 46 are mounted in such a way that they are closely adjacent to the respectively associated chain driving wheel 11 in the processing position of the load carriers 5. Consequently, when the load carriers 5 are in the processing position, the chain abutments 46 also are situated in that edge region of the load carriers 5 which is provided with the respectively associated chain driving wheel 11. The inside of the region covered by the load carriers 5 in the processing position accordingly remains free of interference contours. It is therefore possible for the carriages 6 of the load carriers 5 moved in mutually crossing directions to be moved in that region unimpeded.

A number of embodiments of the invention have been described. Nevertheless, it will be understood that various modifications may be made without departing from the spirit and scope of the invention. Accordingly, other embodiments are within the scope of the following claims.

What is claimed is:

1. A mechanical arrangement for moving workpieces and/or processing remnants from processing of a workpiece, the mechanical arrangement comprising:
    a load carrier that can be loaded with a workpiece, with a processing remnant, or with both a workpiece and a processing remnant, and
    a load carrier drive that moves the load carrier into a target position, the load carrier drive including
    a drive motor,
    a rigid drive chain, and
    a chain driving wheel, supported on the load carrier and drivingly connected with the drive motor, which, when driven by the drive motor, acts on the rigid drive chain on a site of action of the chain driving wheel, the rigid drive chain being configured to convert a driving movement of the chain driving wheel into a movement of the load carrier into the target position, wherein the rigid driving chain is braced against a chain abutment, relative to which the chain driving wheel moves together with the load carrier.

2. A mechanical arrangement according to claim 1, further comprising a chain magazine configured to take up a chain reserve length of the rigid drive chain on the side of the site of action of the chain driving wheel remote from the chain abutment, the chain magazine being movable together with the load carrier as the load carrier moves into the target position.

3. A mechanical arrangement according to claim 2, wherein the chain magazine is provided on the load carrier.

4. A mechanical arrangement according to claim 1, wherein the drive motor is movable together with the load carrier as the load carrier moves into the target position.

5. A mechanical arrangement according to claim 4, wherein the drive motor is mounted on the load carrier.

6. A mechanical arrangement according to claim 1, further comprising a chain rest, relative to which the load carrier is movable during movement into the target position and on which a pushed length of the rigid chain, provided between the chain abutment and the site of action of the chain driving wheel, can be laid down or taken up during movement of the load carrier.

7. A mechanical arrangement according to claim 6, further comprising a drive housing, surrounding the chain driving wheel, which has an opening towards the chain rest, the opening of the drive housing including an entry and exit guide for the rigid chain.

8. A mechanical arrangement according to claim 7, wherein the entry and exit guide includes a surface that is inclined with respect to the chain rest.

9. A mechanical arrangement according to claim 6, wherein the chain rest comprises a rest element provided with a level support surface for the rigid chain.

10. A mechanical arrangement according to claim 6, wherein the chain rest includes at least one rest protrusion, and the rigid drive chain includes chain link plates which extend in the longitudinal direction of the rigid drive chain and which are spaced apart in the transverse direction of the chain, the rest protrusion being received between the chain link plates as the rigid drive chain is laid down on the chain rest.

11. A mechanical arrangement according to claim 6, wherein the chain rest is disposed substantially flush with a surface that supports the load carrier.

12. A mechanical arrangement according to claim 1, wherein the rigid chain includes chain links, each chain link comprising chain link plates extending in the longitudinal direction of the chain and spaced apart in the direction transverse thereto, and link pins extending in the transverse direction of the chain and passing through the chain link plates, wherein the rigid chain is acted upon by the chain driving wheel via the link pins.

13. A mechanical arrangement according to claim 12, wherein the chain driving wheel comprises two sprocket wheels, arranged to act on axially spaced locations of each link pin.

14. A mechanical arrangement according to claim 1, comprising a plurality of load carriers and an associated plurality of load carrier drives.

15. A system for processing workpieces, the system comprising:
a processing unit; and
a mechanical arrangement comprising:
a load carrier that can be loaded with a workpiece, with a processing remnant, or with both a workpiece and a processing remnant, and
a load carrier drive that moves the load carrier into a target position, the load carrier drive including
a drive motor,
a rigid drive chain, and
a chain driving wheel, supported on the load carrier and drivingly connected with the drive motor, which, when driven by the drive motor, acts on the rigid drive chain, wherein the rigid drive chain is braced against a chain abutment and converts a driving movement of the chain driving wheel into a movement of the load carrier into the target position, the chain driving wheel together with the load carrier moving relative to the chain abutment.

16. A system according to claim 15, wherein a processing position of the load carrier at the processing unit is provided as a target position of the load carrier.

17. A system according to claim 16, wherein the chain abutment is arranged close to the processing position of the load carrier in such a manner that a pushed length of the rigid chain between the chain abutment and the site of action of the chain driving wheel when the load carrier is in the processing position is as small as possible.

18. A system according to claim 15, comprising a pair of mechanical arrangements.

19. A system according to claim 18, comprising a plurality of pairs of mechanical arrangements.

20. A system according to claim 19, wherein at least two of the pairs of mechanical arrangements are configured to move orthogonally with respect to each other.

21. A system according to claim 20 wherein at least one pair of mechanical arrangements is configured so that the mechanical arrangements of that pair can move relative to each other.

22. A system for processing workpieces, the system comprising:
a processing unit; and
a plurality of mechanical arrangements, at least two of the mechanical arrangements being configured to move orthogonally with respect to each other, each mechanical arrangement comprising:
a load carrier that can be loaded with a workpiece, with a processing remnant, or with both a workpiece and a processing remnant; and
a load carrier drive that moves the load carrier into a target position, the load carrier drive including
a drive motor,
a rigid drive chain, and
a chain driving wheel, supported on the load carrier and drivingly connected with the drive motor, which, when driven by the drive motor, acts on the rigid drive chain, wherein the rigid drive chain is braced against a chain abutment and converts a driving movement of the chain driving wheel into a movement of the load carrier into the target position, the chain driving wheel together with the load carrier moving relative to the chain abutment.

23. A system according to claim 22, wherein the mechanical arrangements are arranged in pairs, the mechanical arrangements of at least some of the pairs being configured to move together as a unit.

24. A system according to claim 23, wherein at least one pair of mechanical arrangements is configured so that the mechanical arrangements of that pair can move relative to each other.

* * * * *